May 15, 1945.  E. E. MOYER  2,376,169
CONTROL SYSTEM
Filed Dec. 11, 1943
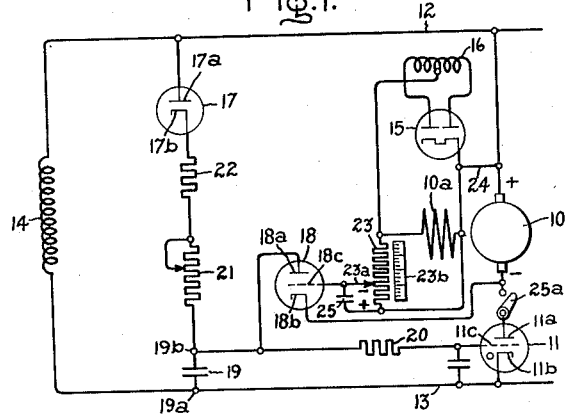
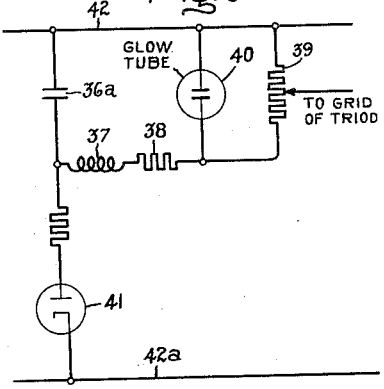
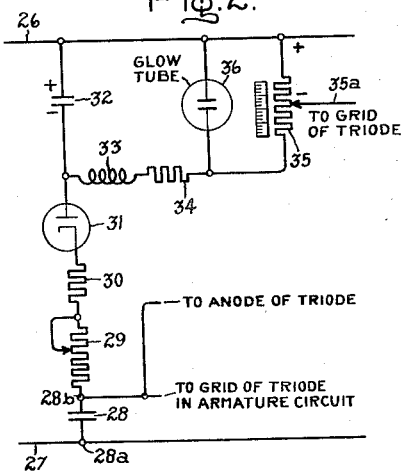
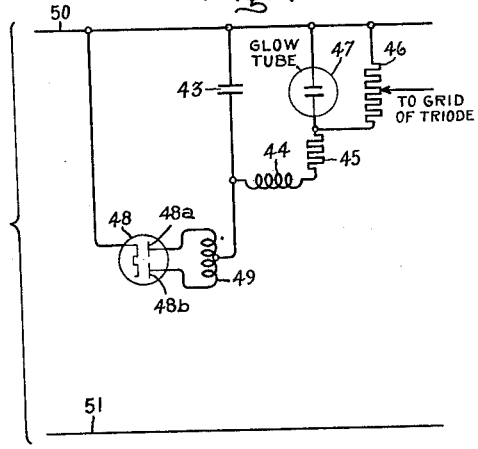
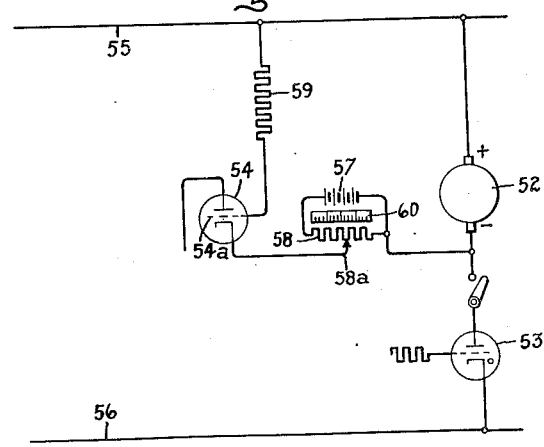
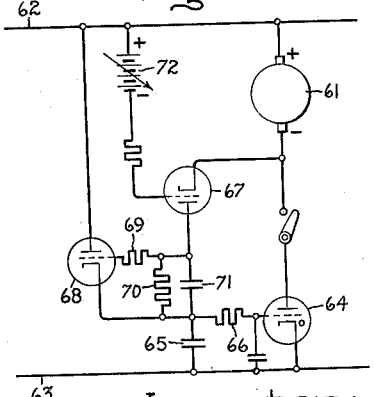
Inventor:
Elmo E. Moyer,
by Harry E. Dunham
His Attorney.

UNITED STATES PATENT OFFICE 2,376,169

CONTROL SYSTEM

Elmo E. Moyer, Scotia, N. Y., assignor to General Electric Company, a corporation of New York Application December 11, 1943, Serial No. 513,898

9 Claims. (Cl. 172—276)

This invention relates to control systems, more particularly to control systems for electric motors, and it has for an object the provision of a simple, reliable, and inexpensive control system of this character.

More specifically the invention relates to motor control systems in which a direct-current motor is supplied through electric valve apparatus from an alternating-current source, and a more specific object of the invention is the provision in a motor control system of this character of means for accurately maintaining a preset speed of the motor and in reducing to a minimum the apparatus required.

In carrying the invention into effect in one form thereof, a grid controlled half-wave rectifier valve is connected between the armature of a direct-current motor and an alternating-current source so that half-wave impulses are supplied to the motor. The amount of current supplied by this valve to the motor armature is varied by means of a network which controls the grid voltage of the valve. This network comprises a capacitor and two parallel and reversely connected electric valves connected across the alternating-current source. Connections are provided from the capacitor to the cathode and grid of the valve which supplies current to the armature. One of the reversely connected valves is a grid controlled valve, and variation of its grid voltage in turn varies the grid voltage of the valve in the armature circuit. A source of adjustable reference voltage is provided together with means for deriving from the motor armature a voltage which is dependent upon the speed of the motor. These two voltages are compared, and the difference is applied to the grid of the reversely connected control valve, which then operates to cause the valve in the armature circuit to cause the motor to operate at a speed corresponding to the magnitude of the reference voltage. Connections between the valve in the armature circuit and the reversely connected control valve prevent the operation of the latter valve during that portion of the voltage wave in which the armature valve is conducting.

For a better and more complete understanding of the invention, reference should now be had to the following specification and to the accompanying drawing of which Fig. 1 is a simple, diagrammatical sketch of an embodiment of the invention; and Figs. 2, 3, 4, 5 and 6 are modifications.

Referring now to the drawing, the armature 10 of a direct-current motor is connected in series with the anode-cathode conducting path of an electric valve 11 across the supply conductors 12 and 13 which are connected to the secondary winding 14 of a supply transformer, of which the primary winding (not shown) is connected to a suitable alternating-current source (not shown). Alternatively, the supply conductors 12 and 13 may be directly connected to an alternating-current source of suitable voltage, e. g. 230 volts.

Although the electric valve 11 may be of any suitable type, it is preferably of the type having an anode, a cathode, and a control grid, and into the envelope of which a small quantity of an inert gas, such as mercury vapor or argon, is introduced. The presence of this gas within the envelope converts the usual pure electronic discharge into an arc stream, so that the valve becomes a grid controlled arc rectifier. The grid has control only of the starting of the discharge. However, by varying the firing point, i. e., the time in the positive half-cycle of the anode voltage at which the grid voltage attains the critical value necessary to initiate current flow in the anode-cathode circuit, the average value of the current which flows in the output circuit can be varied. If the firing point occurs at or near the beginning of the positive half-cycle of anode voltage, maximum current will flow in the output circuit. If the firing point occurs at the 180-degree point, the current flow will be a minimum or zero. For intermediate firing points the output current will have corresponding intermediate values.

As shown in the drawing, one armature terminal of the motor 10 is connected to the supply conductor 12 and the other terminal is connected to the anode 11a of valve 11. The cathode 11b of the valve is connected to the opposite supply conductor 13.

Preferably, the field winding 10a of the motor is separately excited from a suitable source, such as the double diode rectifier valve 15 and the transformer secondary winding 16 to which it is connected for full-wave rectification. The primary winding (not shown) of this transformer may be supplied from any suitable source of alternating voltage.

For the purpose of varying the firing point of the valve 11 in each positive half-cycle of anode voltage, a network is provided which comprises the two electric valves 17 and 18 and the capacitor 19 of which the lower terminal 19a is connected to the supply conductor 13, and the upper terminal 19b is connected through a protective resistor 20 to the grid 11c of valve 11. The terminal 19b is also connected through the adjustable resistor 21, fixed resistor 22, and valve 17 to the opposite supply conductor 12. Thus, the capacitor 19 is connected across the cathode 11b and the grid 11c of valve 11, so that any voltage across the capacitor will be applied across cathode 11b and grid 11c.

Preferably, the valve 17 is a diode valve having an anode 17a and a cathode 17b. The electric valve 18 is a controlled valve having an anode 18a, a cathode 18b, and a control grid 18c. This valve is connected in a circuit which extends from the supply conductor 13 through capacitor 19 and motor armature 10 to the opposite supply conductor 12. It is thus connected in parallel with diode valve 17 and is reversely connected with respect thereto, i. e., its anode 18a is connected to the capacitor terminal 19b to which the cathode 17b of the diode is indirectly connected, and its cathode 18b is connected through armature 10 to the supply conductor 12 to which the anode 17a of the diode is connected.

Owing to the reverse connection of the two valves 17 and 18, both halves of the alternating voltage wave of the source 12, 13 are applied to the capacitor 19 and thus the capacitor is alternately charged with voltages of opposite polarity. Thus during the half-cycle in which the valve 17 conducts, the voltage of the terminal 19b is positive, and during the succeeding half-cycle in which the valve 18 conducts, the capacitor is discharged and recharged to the opposite polarity, so that the terminal 19b has a negative voltage. If valves 17 and 18 conduct equal amounts, the voltage across the capacitor 19 is an alternating voltage having no direct-current component. This alternating voltage will lag the anode voltage of valve 11 by approximately 90 degrees if the reactance of capacitor 19 is small compared to the equivalent resistance of the valves 17 and 18. However, if the amounts of current conducted by the two reversely connected control valves are unequal, the alternating voltage across capacitor 19 will have a direct-current component, the polarity of which depends upon which of the two oppositely directed currents is the greater and the magnitude of which depends upon the difference in the amounts of the two currents. Thus, if the valve 17 conducts more current than valve 18, the polarity of the net direct-current component across capacitor 19 will be such that the terminal 19b is positive with respect to terminal 19a. Conversely, if valve 18 conducts more current than valve 17 conducts, the voltage of terminal 19b is negative with respect to terminal 19a. Since the grid 11c of the valve 11 is connected to terminal 19b, the effect of varying the direct-current component of the voltage across capacitor 19 is to vary the firing point of valve 11. Thus, as the direct-current component increases in a direction to make terminal 19b more positive, the firing point of valve 11 is advanced and the amount of current supplied by valve 11 to the armature 10 is correspondingly increased. Conversely, as the direct-current component is varied in a direction to make terminal 19b more negative, the firing point of valve 11 is retarded and the amount of current supplied to the armature 10 is correspondingly decreased.

The amount of current conducted by the valve 18 is controlled by the difference of a reference voltage and a voltage which is dependent upon the speed of the motor. In order to provide for presetting the operating speed of the motor at a desired value, preferably the reference voltage is made adjustable. As shown, the source of reference voltage is a potentiometer 23 which is connected in parallel with the motor field winding 10a. The voltage proportional to the motor speed is derived from the countervoltage of the armature. In order that the difference of these two voltages may be applied to the cathode-grid circuit of control valve 18, the positive terminal of potentiometer 23 is connected to the positive terminal of armature 10 by means of conductor 24, the grid 18c is connected to the slider 23a, and the cathode 18b is connected to the negative terminal of armature 10. For the purpose of filtering the ripple voltage from the reference voltage, a capacitor 25 is connected between the positive terminal of potentiometer 23 and the slider 23a.

A dial 23b calibrated in terms of motor speed is operatively associated with the slider 23a.

A starting switch 25a is included in the armature circuit of the motor between the anode 11a and the point at which the connection to the cathode 18b is taken off. This is preferably an electromagnetically operated contractor, the operation of which is controlled by suitable switching devices, such as pushbutton type starting and stopping switches. However, since the electromagnetic control circuits are conventional the contractor is illustrated in the drawing simply as a manually operated switch.

With the foregoing understanding of the elements and their organization, the operation of the system will readily be understood from the following detailed description.

The speed at which it is desired to operate the motor is preset by adjusting the slider 23a to the point on the potentiometer 23 which corresponds to the desired speed as indicated by the calibrated dial. Since the motor is at rest and is not generating any countervoltage, the voltage of the cathode 18b is more positive than the grid voltage, and the current conducted by the valve 18 is zero or a minimum. Consequently, the direct-current component across capacitor 19 is maximum in the direction which makes the terminal 19b and the grid 11c of valve 11 more positive. As a result, the firing point of valve 11 is fully advanced.

The motor is started by closing the switch 25a to complete the armature circuit between the negative brush of the armature and the anode 11a of the valve 11. Since the valve 11 is phased full on, it will supply maximum current to the armature of the motor 10. This causes the motor to accelerate at a rate which is dependent upon the load on the motor shaft. As the speed of the motor increases, the countervoltage generated in the armature increases correspondingly, with the result that the voltage at the cathode 18b of valve 18 becomes increasingly negative as the speed of the motor increases.

As a result of the voltage of the cathode 18b becoming negative, the valve 18 becomes conducting during those half-cycles of the alternating-current voltage wave in which the valve 11 is nonconducting. The current conducted by the valve 18 reduces the net direct-current component across the capacitor 19 and may even reverse the polarity of this component, depending upon the position of the slider 23a on the potentiometer 23. The decrease of the net direct-current component across the capacitor 19 from a positive value, or the increase of this component in a negative direction makes the voltage of the grid 11c more negative with respect to its cathode 11b. The result of this is to decrease the current supplied by the valve 11 to the armature 10.

This acceleration of the motor 10 continues until a balanced or equilibrium condition is reached such that any further increase in the countervoltage of the motor would cause the valve 11 to decrease the amount of current supplied to the armature 10 to such an extent that the speed of the motor 10 would begin to decrease.

Owing to the connection of the cathode 18b of valve 18 to the anode 11a of valve 11 and the connection of anode 18a of valve 18 to the grid 11c of valve 11, the control valve 18 does not conduct an appreciable amount of current during the conducting period of the valve 11. Consequently, the valve 18 is responsive to the voltage of the armature 10 during the time in which no current is flowing in the armature circuit, and hence, during a time in which the countervoltage of the armature is a true measure of the speed of the motor. Consequently, the control is not affected by the RI drop of the motor armature, and thus the control maintains the speed of the motor constant irrespective of the load.

A certain degree of compounding is obtained owing to the maintenance of the current flow through the valve 11 for a portion of the negative half-cycle of the voltage wave as a result of the inductance of the armature winding. In some cases, this current flow may be maintained throughout the first quarter of the inverse half-cycle. The portion of the inverse half-cycle of the voltage wave during which current flow is maintained by the inductance of the armature is proportional to the amount of current which flows in the armature circuit during the positive half-cycle. The result is that the total conducting time of the valve 18 is proportionately reduced, which produces a proportional turn-on tendency of the valve 11. Thus, the control is slightly overcompounded or compensated for the load. This results in holding the speed of the motor very constant throughout the entire load range.

The system shown in Fig. 2 differs from the system of Fig. 1 in the provision of a different source of reference voltage for presetting the speed of the motor. In this modification, the conductors 26 and 27 constitute an alternating-current source corresponding to the conductors 12, 13 of Fig. 1. The capacitor 28, the adjustable resistor 29, fixed resistor 30, and diode valve 31 correspond to the capacitor 19, adjustable resistor 21, fixed resistor 22, and diode valve 17 of Fig. 1. The terminal 28a of the capacitor 28 is connected to the conductor 27 and the terminal 28b is connected both to the grid of the valve which supplies current to the armature of the motor and to the anode of the triode just as in the modification of Fig. 1. This is not shown in Fig. 2 but is indicated by appropriate legend.

A capacitor 32 is included between the anode of the diode 31 and the conductor 26 of the source. This capacitor 32 is charged to the polarity indicated and the voltage across the capacitor 32 is applied through a smoothing reactor 33 and resistor 34 to the terminals of a potentiometer 35, one terminal of which is connected to the supply conductor 26. The slider 35a of this potentiometer is connected to the grid of the triode control valve (not shown) which corresponds to the valve 18 of Fig. 1 and which is connected in the circuit in the same manner as the valve 18 of Fig. 1. A gaseous type electric discharge diode valve 36 known to the art as a glow tube is connected across the potentiometer 35. An important characteristic of this type of valve is that the voltage across its anode and cathode remains constant even though the voltage of the source varies, and consequently, the valve 36 serves as a voltage regulating tube for the voltage applied to the potentiometer 35.

The desired operating speed of the motor is preset by moving the slider 35a to the proper position on the potentiometer 35 as indicated on the calibrated dial. In all other respects the operation is the same as the operation of the system of Fig. 1 as described in the foregoing.

In the modification of Fig. 3, the capacitor 36a, the inductance 37, the resistor 38, the potentiometer 39, and the voltage regulating valve 40 correspond to the capacitor 32, the inductance 33, the resistor 34, potentiometer 35, and voltage regulating valve 36 of Fig. 2, and have identical functions. The only difference between the modification of Fig. 3 and the modification of Fig. 2 is that the capacitor 36a is not charged by current flowing through a diode valve which is connected to the grid circuit of the valve which supplies current to the armature of the motor, but is charged by current conducted by an entirely separate diode valve 41 with which it is connected in series across the alternating-current source 42, 42a.

In the modification of Fig. 4, the capacitor 43, the inductance 44, the resistor 45, the potentiometer 46, the glow tube 47 and the diode valve 48 correspond in structure and function to the capacitor 36a, inductance 37, resistor 38, potentiometer 39, glow tube 40, and diode valve 41, respectively, of Fig. 3. The only difference between the system of the modification of Fig. 4 and the system of the modification of Fig. 3 is that the capacitor 43 instead of being charged by a half-wave rectifier valve is charged by the full-wave diode rectifier valve 48 which is supplied from the secondary winding 49 of a transformer to the opposite terminals of which the anodes 48a and 48b are connected as shown. The primary winding of the transformer is supplied from a suitable alternating-current source such as represented by the two conductors 50 and 51. The operation is similar to the operation of the system of Fig. 1 as described in the foregoing.

In the modification of Fig. 5, the motor armature 52, the electric valve 53, and the triode control valve 54 correspond to the armature 10, the valve 11, and the triode control valve 18, respectively, of Fig. 1. The armature 52 is connected in circuit with the anode-cathode conducting path of the valve 53 across an alternating-current source which is represented by the two supply conductors 55, 56. The difference between the system of the modification of Fig. 5 and the system of the modification of Fig. 1 is that the reference voltage with which the voltage proportional to speed is compared is provided by means of a source of reference voltage in the cathode circuit of the triode control valve. This source is illustrated as comprising a battery 57, and an adjustable potentiometer 58 connected across the battery 57. The grid 54a of the triode control valve 54 is connected through a protective resistor 59 to the side of the source 55 with which the positive terminal of the motor armature is connected.

The speed at which it is desired to operate the motor is preset by adjusting the slider 58a of the potentiometer to the point on the potentiometer corresponding to the desired speed as indicated on the graduated dial 60. The remainder of the operation is the same as the operation of the system of Fig. 1 as described in the foregoing.

The modified system of Fig. 6 is very similar to the system of Fig. 1. It differs from the system of Fig. 1 primarily in the use of a triode valve in the phase shifting network instead of the diode valve 17 of Fig. 1. Thus, in Fig. 6, the motor 61 is connected across the A-C, source 62, 63 in series with a thyratron valve 64 which corresponds to the thyratron valve 11 of Fig. 1. The capacitor 65, resistor 66 and triode valve 67 correspond to the capacitor 19, resistor 20 and triode valve 18, respectively, of Fig. 1. Valve 68, which corresponds to valve 17 of Fig. 1, is a triode, and its grid is connected through a resistor 69 to the anode of valve 67. A resistor 70 is connected across the grid and cathode of valve 68 and is included in the anode circuit of valve 67 so that a voltage drop proportional to the anode current of valve 67 is produced across its terminals. A capacitor 71 connected in parallel with the resistor 70 is charged by this voltage drop and applies a bias voltage to the grid of valve 68 which renders the grid of valve 68 increasingly negative as the current transmitted by valve 67 increases.

A reference voltage is obtained from any suitable source such as the adjustable battery 72 which corresponds to the potentiometer 23 of Fig. 1. The difference between the reference voltage and the countervoltage of motor 61 is applied between the cathode and grid of valve 67.

The operation is generally similar to the operation of the modification of Fig. 1 and will readily be understood from the foregoing.

Although in accordance with the provisions of the patent statutes this invention is described as embodied in concrete form and the principle thereof has been explained, together with the best mode in which it is now contemplated applying that principle, it will be understood that alterations and modifications will readily suggest themselves to persons skilled in the art without departing from the true spirit of this invention or from the scope of the annexed claims.

What I claim as new and desire to secure by Letters Patent of the United States, is:

1. A control system for a D.-C. electric motor comprising in combination, a source of alternating voltage, means for supplying half-wave unidirectional current to the armature of said motor comprising an electric valve provided with anode, cathode, and control grid and having its anode-cathode path included in a circuit with said source and said armature, means for supplying to said grid a voltage having a periodically varying component and a direct component comprising a capacitor having connections to said grid and cathode and a pair of reversely connected electric valves connected in circuit with said capacitor across said source, one of said reversely connected valves having an anode, a cathode, and a control grid, a source of reference voltage, and connections for supplying to the grid and cathode of said reversely connected valve the difference between a voltage derived from the armature terminals of said motor and said reference voltage.

2. A control system for a D.-C. electric motor comprising in combination, means for supplying half-wave unidirectional current to the armature of said motor comprising an electric valve provided with a cathode, a control grid, and an anode connected to one terminal of said armature and connections from the other terminal of said armature and from said cathode to opposite sides of a source of alternating voltage, and means for supplying to said grid a periodically varying voltage having a direct-current component comprising a capacitor having one terminal connected to said grid and the other to said cathode, an electric valve connected in circuit with said capacitor across said source and a third electric valve connected from said grid to said anode and provided with a control grid, a source of reference voltage and means for applying to the grid and cathode of said third valve the difference between said reference voltage and a votage derived from the armature voltage of said motor comprising connections from said source of reference voltage to the armature circuit of said motor and to the grid of said second valve thereby to vary said direct-current component to maintain the speed of said motor in correspondence with the magnitude of said reference voltage.

3. A control system for a D.-C. electric motor comprising in combination, means for supplying half-wave current impulses to the armature of said motor comprising a valve provided with an anode, a cathode, and a control grid and connections from said anode to one terminal of said armature and from the other terminal of said armature and said cathode to opposite sides of said source, a source of adjustable reference voltage having a connection to the armature circuit of said motor, and means for controlling said electric valve to cause the speed of said motor to correspond to the magnitude of said reference voltage comprising a capacitor having one terminal connected to said grid and the other terminal connected to the same side of said source as said cathode, a half-wave rectifier connected between the other side of said source and said capacitor and a reversely connected rectifier having a cathode connected to said anode and an anode connected to said grid, and a grid connected to said source of reference voltage so that the difference of said reference voltage and a voltage proportional to the speed of said motor is applied to the grid and cathode of said reversely connected rectifier only during the inactive half-cycle of said electric valve.

4. A control system for a D.-C. electric motor comprising in combination, means for supplying half-wave current impulses to the armature of said motor from an alternating-current source comprising an electric valve having an anode and a cathode connected in circuit with said armature and provided with a control grid, a source of reference voltage, means for producing a control voltage proportional to the speed of said motor, means for controlling the grid voltage of said first electric valve to cause the speed of said motor to correspond to the magnitude of said reference voltage comprising a second electric valve provided with an anode, a cathode, and a control grid connected to be responsive to the difference of said reference and control voltages, and connections from said first valve to said second valve for rendering said second valve nonconducting when said first valve is conducting thereby to compensate the speed of said motor in accordance with the load.

5. A control system for a D.-C. electric motor comprising in combination, means for supplying half-wave current impulses to the armature of said motor comprising a first electric valve provided with a control grid and with an anode and cathode connected in circuit with said armature to a source of alternating voltage, means for supplying to the grid of said valve a periodically varying voltage having a direct-current component comprising a capacitor and two reversely connected electric valves connected in circuit with said capacitor across said source, one of said reversely connected valves being a triode valve provided with an anode, a cathode, and a control grid, a source of adjustable reference voltage, means for producing a control voltage proportional to the speed of said motor, connections for supplying to the cathode and grid of said triode valve the difference of said reference and control voltages to vary said direct-current component to cause the speed of said motor to correspond to the magnitude of said reference voltage, and connections from said first electric valve to said triode valve for rendering said triode valve non-conducting when said first electric valve is conducting thereby to compensate the voltage supplied to said motor in accordance with the load.

6. A control system for a D. C. electric motor comprising in combination, means for supplying half-wave current impulses to the armature of said motor comprising supply source connections, and a first electric valve provided with a control grid and with an anode and a cathode connected in circuit with said armature across said supply connections, means for supplying to said grid a periodically varying voltage having a direct-current component comprising a capacitor and two reversely connected electric valves connected across said supply connections and connections from said capacitor to said cathode and grid, one of said reversely connected valves being a triode having an anode, a cathode, and a control grid, a source of adjustable direct-current reference voltage, and connections for supplying to the grid and cathode of said triode valve the difference of said reference voltage and a voltage derived from the armature of said motor thereby to vary said direct-current component to control said first electric valve to maintain the speed of said motor at a value corresponding to the magnitude of said reference voltage.

7. A control system for a D. C. electric motor comprising in combination, means for supplying half-wave current impulses to the armature of said motor comprising supply source connections, and a first electric valve provided with a control grid and with an anode and a cathode connected in circuit with said armature across said supply connections, means for supplying to said grid a periodically varying voltage having a direct-current component comprising a capacitor and two reversely connected electric valves connected across said supply connections and connections from said capacitor to said cathode and grid, one of said reversely connected valves being a triode having an anode, a cathode, and a control grid, a source of adjustable direct-current reference voltage comprising means for supplying a direct-current voltage to the field winding of said motor and a potentiometer connected across said field winding, and connections for supplying to the cathode and grid of said triode valve the difference of a voltage derived from said potentiometer and a voltage derived from the armature of said motor thereby to vary said direct-current component to control said first electric valve to maintain the speed of said motor at a value corresponding to the magnitude of said reference voltage.

8. A control system for a D. C. electric motor comprising in combination, means for supplying half-wave current impulses to the armature of said motor comprising supply source connections, and a first electric valve provided with a control grid and with an anode and a cathode connected in circuit with said armature across said supply connections, means for supplying to said grid a periodically varying voltage having a direct-current component comprising a capacitor and two reversely connected electric valves connected across said supply connections and connections from said capacitor to said cathode and grid, one of said reversely connected valves being a triode having an anode, a cathode, and a control grid, a source of adjustable direct-current reference voltage comprising a rectifier and a second capacitor connected in series relationship to said supply connections, an adjustable potentiometer connected in a circuit in parallel to said second capacitor and a voltage regulating valve connected in parallel with said potentiometer for maintaining a substantially constant voltage across said potentiometer, and connections for supplying to the cathode and grid of said triode valve the difference of a reference voltage derived from said potentiometer and a voltage derived from said armature thereby to vary said direct-current component to control said first electric valve to maintain the speed of said motor at a value corresponding to the magnitude of said reference voltage.

9. A control system for a D. C. electric motor comprising in combination, means for suplying half-wave current impulses to the armature of an electric motor comprising supply source connections and a first electric valve provided with a control grid and with an anode and a cathode connected in circuit with said armature across said supply connections, means for supplying to said grid a periodically varying voltage having a direct-current component comprising a capacitor and a pair of parallel and reversely connected rectifiers connected in circuit with said capacitor across said supply connections and connections from said capacitor to said cathode and grid, one of said reversely connected valves being a triode and having an anode, a cathode, and a control grid, a source of adjustable direct-current reference voltage comprising a second capacitor connected in series with one of said reversely connected valves, a potentiometer connected in parallel with said second capacitor and a voltage regulating valve connected in parallel for maintaining a substantially constant voltage across said potentiometer, and connections for supplying to the cathode and grid of said triode valve the difference of a reference voltage derived from said potentiometer and a voltage derived from said armature thereby to vary said direct-current component to control said first electric valve to maintain the speed of said motor at a value corresponding to the magnitude of said reference voltage.

ELMO E. MOYER.